३,565,853
ORGANIC NITRITE STABILIZED
OLEFIN POLYMERS
Clive D. Moon, Bartlesville, Okla., assignor to Phillips
Petroleum Company, a corporation of Delaware
No Drawing. Filed Oct. 21, 1968, Ser. No. 769,363
Int. Cl. C08f 45/60
U.S. Cl. 260—45.9     4 Claims

ABSTRACT OF THE DISCLOSURE

Olefin polymers are stabilized to minimize melt flow dropoff at elevated temperatures by admixing polymer with a stabilizing amount up to 2.0 weight percent of an organic nitrite, R—O—N=O, where R is an aliphatic radical with 8–20 carbon atoms.

---

This invention relates to a method for stabilizing olefin polymers. In another aspect, this invention relates to olefin polymers which are stabilized against melt flow dropoff at elevated temperatures.

Normally, polymers and other plastic materials are processed by heating the material to a temperature level where they become softened and then shaping the softened polymer into the desired form by various techniques such as extruding, injection molding, blow molding, and other types of thermoforming. At these high temperatures, many polymers demonstrate a melt flow dropoff which causes problems in the production of the polymer, as well as in the fabrication. For example, times required for various molding processes are increased because of the longer time required by the less fluid polymer to fill the molds.

Briefly, melt flow is the amount, in grams, of a resin that can be forced through an orifice, when subjected to a given force for given time intervals at a given temperature. Melt flow dropoff is a decrease in the melt flow from time interval to time interval, usually reaching a relatively constant melt flow. Naturally, if the dropoff is too great, the resin will cease to flow or flow slowly, resulting in the above-mentioned problems.

The polymer is often processed into pellets by extrusion techniques. A melt flow dropoff during this processing results in flow characteristic changes which can limit the potential applications for the process polymer Also, in applications where clearness is desired, e.g., film manufacture, it is important that the stabilized polymer have minimum discoloration.

Various methods of stabilizing these polymers have met with varying degrees of success, and many attempts have been made to find improved methods for stabilizing these polymers.

I have discovered that olefin polymers can be stabilized against melt flow dropoff at elevated temperatures by admixing the polymer with very small stabilizing amounts of organic nitrite. I have also discovered that melt flow stability of these polymers can be obtained without inducing any undesirable discoloration to the polymer. The processibility of these stabilized polymers is also improved by this invention.

Accordingly, an object of this invention is to provide an improved method for stabilizing olefin polymers against melt flow dropoff during hot processing. Another object of this invention is to provide an olefin polymer composition capable of being hot processed with little or no decrease in melt flow.

Other objects, aspects and advantages of my invention will become apparent to one skilled in the art from the following disclosure and claims.

In my invention, olefin polymers are stabilized to minimize melt flow dropoff at elevated temperatures by admixing the polymer with a stabilizing amount up to 2.0 weight percent of organic nitrite, based on the total weight of the polymer and a stabilizing additive. A stabilizing amount is an amount sufficient to provide thermal stabilization to the polymer by decreasing the melt flow dropoff. This lower limit can be as low as 0.01 weight percent of organic nitrite; depending on the specific organic nitrite employed, the degree of heat employed in processing, the length of time for processing, and the degree of melt flow dropoff desired.

The stabilizing additive can be added to the polymer by any suitable means which effects a homogeneous distribution of the additive in the polymer. The stabilizing additive can be mixed with polymer in any particulate form, such as granular, pellet, powder, or fluff, my mechanical mixing techniques such as dry blending, milling or kneading with devices such as Henschel mixer, a Banbury mixer, a Brabender Plastograph, a Waring Blendor, a roll-mill and the like.

The organic nitrites can be added to the polymer at any time following preparation and before processing into a finished product. For example, the polymer can be mixed with a solution of organic nitrites and a hydrocarbon solvent such as n-pentane, n-hexane or mixtures thereof, or a ketone solvent such as acetone. The concentration of organic nitrite in the solvent will range from 0.01 weight percent to the stabilizing additive's limit of solubility in the solvent used. The solvent is then allowed to evaporate and the polymer is processed in the usual manner.

Suitable organic nitrites have the general formula R—O—N=O, where R is a alkyl or cycloalkyl or substituted alkyl or cycloalkyl radical having from 8–20 carbon atoms. Specific examples of R are octyl, cetyl, dodecyl, heptadecyl, eicosyl, ethylcyclohexyl, diethylcyclopentyl radicals, and the like.

The stabilizing additives can be effectively employed in olefin polymers which are subject to melt flow dropoff. The term "polymer" as herein used designates either homopolymers, copolymers, or blends thereof. This invention is especially effective with polymers of 1-olefins having 2 to 8 carbon atoms per molecule. Specific examples of homopolymers are homopolymers of ethylene, propylene, butene - 1, pentene - 1, 4 - methylpentene-1, hexene-1, heptene-1, octene-1, and the like. Specific examples of copolymers are copolymers of ethylene and propylene, of ethylene and butene-1, of propylene and butene-1, of ethylene and hexene-1, of propylene and octene-1, of ethylene and 4-methyl pentene-1, of ethylene and octene-1, of hexene-1 and octene-1, and the like.

Olefin polymers capable of being stabilized in accordance with this invention can be made by any of the various known polymerization processes. For example, polymers prepared by the polymerization process described in U.S. Pat. 2,825,721, Hogan et al. (1958) and British Pat. 853,414, Phillips Petroleum Company (1960) can be stabilized with the additives of this invention. Polymers made by the high pressure process or by a process in which organometal catalyst systems are employed are examples of other polymers that can also be used. The polymer to be stabilized can contain other additives such as stress-cracking inhibitors, antioxidants, fillers, pigments, crosslinking agents, plasticizers, and the like. The stabilizing additives of this invention are effective with or without these other additives.

The advantages of my invention are further illustrated by the following examples. The reactants, proportions, and other specific conditions are presented as being typical and should not be construed to limit the invention unduly.

EXAMPLE I

Samples were prepared from polyethylene made by the particle-form process of British patent 853,414 using a chromium oxide-containing catalyst. The polymer had a melt index of 0.07 dg./min. (ASTM D1238–62T, Condition E) and a density of 0.96 g./cc. (ASTM D1505–63T). The polymer fluff was slurried with a solution of octyl nitrite in normal hexane for about 3 minutes in a stirred container. The solvent was then allowed to evaporate and the fluff was blended for 3 minutes on a Brabender Plastograph at 190° C. at 50 r.p.m. The melt flow drop off was determined by measuring the amount of polymer extruded through the orifice of the melt indexer at 288° C. during consecutive 5-minute intervals, using a piston load of 2200 grams. One sample with no octyl nitrite additive was used as a control. Samples 1, 2, and 3 contained 0.15, 0.05 and 0.025 gram respectively of octyl nitrite per 20 ml. of n-hexane for 50 g. of polymer. The results are shown in Table I.

TABLE I

| Sample | Concentration of octyl nitrite, wt. percent | Weight of polymer extruded, grams, for indicated time interval, min. | | | | | Percent decrease in melt flow between 5 and 25 minutes |
|---|---|---|---|---|---|---|---|
| | | 0–5 | 5–10 | 10–15 | 15–20 | 20–25 | |
| 1 | 0.3 | 0.55 | 0.54 | 0.53 | 0.52 | 0.49 | 11 |
| 2 | 0.1 | 0.36 | 0.33 | 0.33 | 0.32 | 0.31 | 14 |
| 3 | 0.05 | 0.21 | 0.21 | 0.20 | 0.19 | 0.18 | 14 |
| 4 | 0 (control) | 0.08 | 0.04 | 0.03 | 0.03 | 0.03 | 62 |

The data show that octyl nitrite treatment substantially prevents melt flow dropoff.

EXAMPLE II

Polyethylene samples were prepared as in Example I. The polymer fluff was slurried with a solution of cetyl nitrite in normal hexane for about 3 minutes in a stirred container. The melt flow dropoff was determined as in Example I. One sample with no cetyl nitrite was used as a control. Samples 1 and 3 contained 0.35 and 0.2 gram respectively of cetyl nitrite per 20 ml. of acetone for 50 g. of polymer. Samples 2 and 4 contained 0.3 and 0.05 gram respectively of cetyl nitrite per 20 ml. n-pentane. The cetyl nitrite used in this example was a liquid and had a boiling point of 120–124° C./2 mm. Hg. The results are shown in Table II.

TABLE II

| Sample | Concentration of cetyl nitrite, wt. percent | Weight of polymer extruded, grams, for indicated time interval, min. | | | | | Percent decrease in melt flow between 5 and 25 minutes |
|---|---|---|---|---|---|---|---|
| | | 0–5 | 5–10 | 10–15 | 15–20 | 20–25 | |
| 1 | 0.7 | 0.29 | 0.23 | 0.22 | 0.22 | 0.18 | 38 |
| 2 | 0.6 | 0.24 | 0.18 | 0.16 | 0.15 | 0.14 | 42 |
| 3 | 0.4 | 0.21 | 0.18 | 0.16 | 0.15 | 0.13 | 38 |
| 4 | 0.1 | 0.13 | 0.09 | 0.08 | 0.06 | 0.05 | 61 |
| 5 | 0 (control) | 0.10 | 0.05 | 0.04 | 0.04 | 0.04 | 60 |

Improved results in the melt flow dropoff were also achieved by treating the polymer with cetyl nitrite.

I claim:
1. A composition stabilized against melt flow dropoff at elevated temperatures comprising a blend of a polymer of a 1-olefin having 2 to 8 carbon atoms and a stabilizing amount up to 2.0 weight percent of an organic nitrite, R—O—N=O, where R is an alkyl or cycloalkyl radical with 8–20 carbon atoms.
2. The composition of claim 1 wherein said polymer is polyethylene.
3. The composition of claim 2 wherein said organic nitrite is octyl nitrite.
4. The composition of claim 2 wherein said organic nitrite is cetyl nitrite.

References Cited
UNITED STATES PATENTS

| 2,943,075 | 6/1960 | Schweitzer | 260—45.9 |
| 3,010,939 | 1/1961 | Dimsberg | 260—45.9 |
| 3,054,766 | 9/1962 | Van Hook | 260—45.9 |
| 3,247,162 | 4/1966 | Newland et al. | 260—45.9 |

HOSEA E. TAYLOR, Primary Examiner